Sept. 13, 1932.  C. A. COLGREN  1,877,269
STONE MILLING MACHINE
Filed Jan. 17, 1929  5 Sheets-Sheet 4

INVENTOR:
CHARLES A. COLGREN,
BY Cheever, Cox & Moore
ATTYS

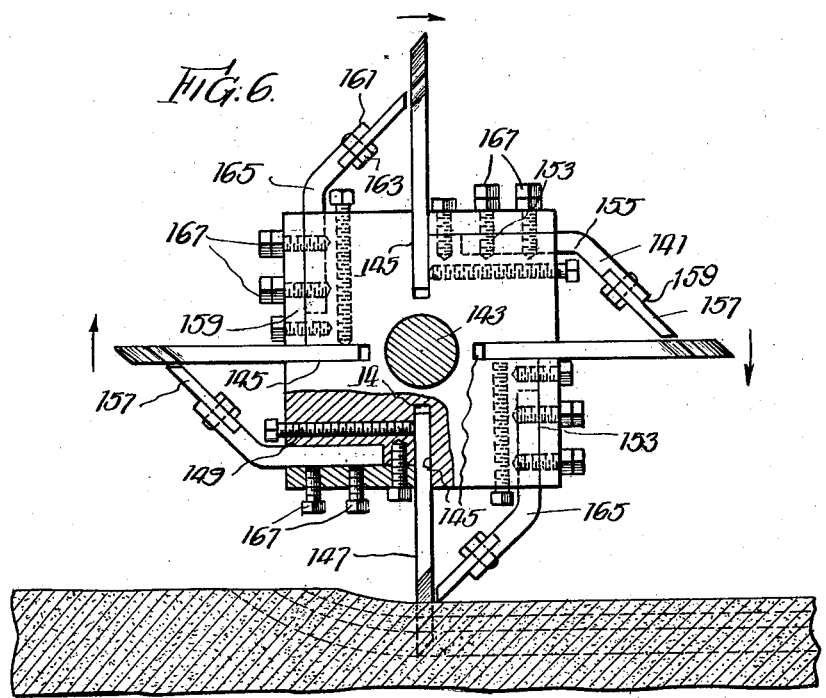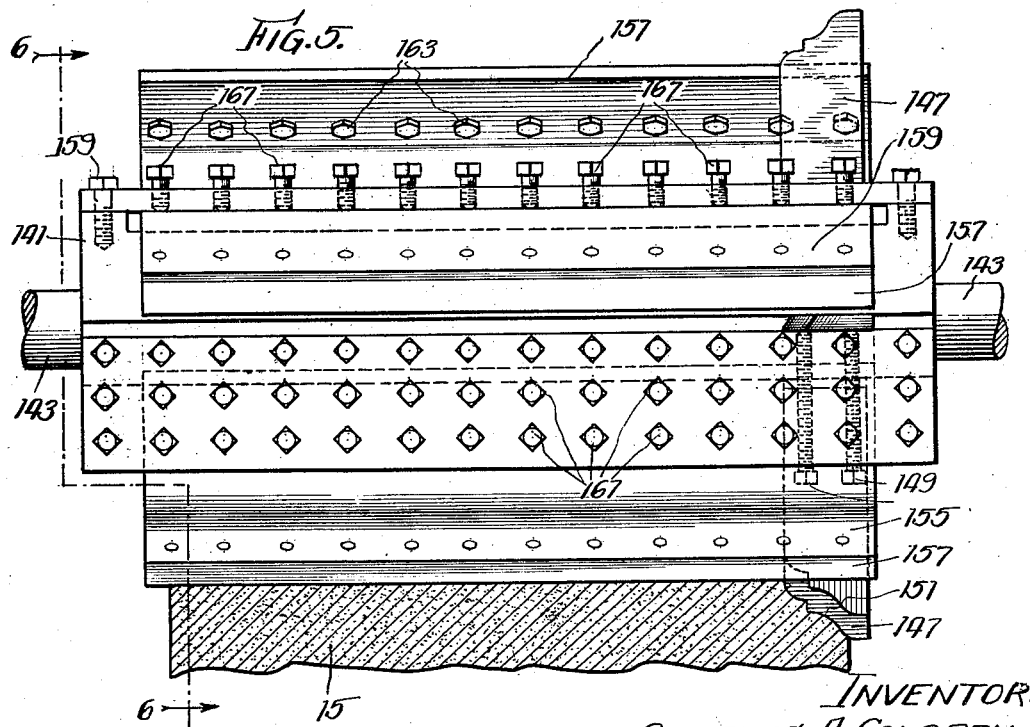

Patented Sept. 13, 1932

1,877,269

UNITED STATES PATENT OFFICE

CHARLES A. COLGREN, OF BLOOMINGTON, INDIANA

STONE MILLING MACHINE

Application filed January 17, 1929. Serial No. 333,098.

My invention relates in general to stone milling machines, and has more particular reference to a novel means for and method of milling stone.

An important object of my present invention is to provide a novel stone milling machine of rugged construction and capable of taking an unusually heavy cut for roughening the stone to size and being controllable to take a light cut for finishing purposes.

Another important object of my invention is to provide a stone milling machine capable of performing the milling operations simultaneously upon several faces of the stone.

Another important object of my invention is to provide a rotary stone milling cutter of novel construction capable of carrying a plurality of finishing tools whereby various configurations may be formed in a work piece with a minimum of manipulation.

Still another important object of my invention is to provide a stone milling machine assembly arranged conveniently so that the time and consequently the expense of performing milling operations upon stone may be materially reduced.

Among the other important objects of my invention is to provide neatness, compactness and simplicity in a stone milling machine; to provide an easily operated milling machine of improved and enlarged scope; to provide an improved and simplified method for milling stone; to reduce the cost of milling stone; and to improve the quality and texture of milled stone surfaces.

Numerous other objects and advantages of the invention will be apparent as it is more fully understood from the following description, which, taken in connection with the accompanying drawings, discloses a preferred embodiment of the invention.

Referring to the drawings:

Figure 5 is a perspective view of a rotary milling cutter forming a part of the machine embodying my invention; and Figure 6 is a vertical cross section taken substantially along the line 6—6 in Figure 5.

Figure 1:
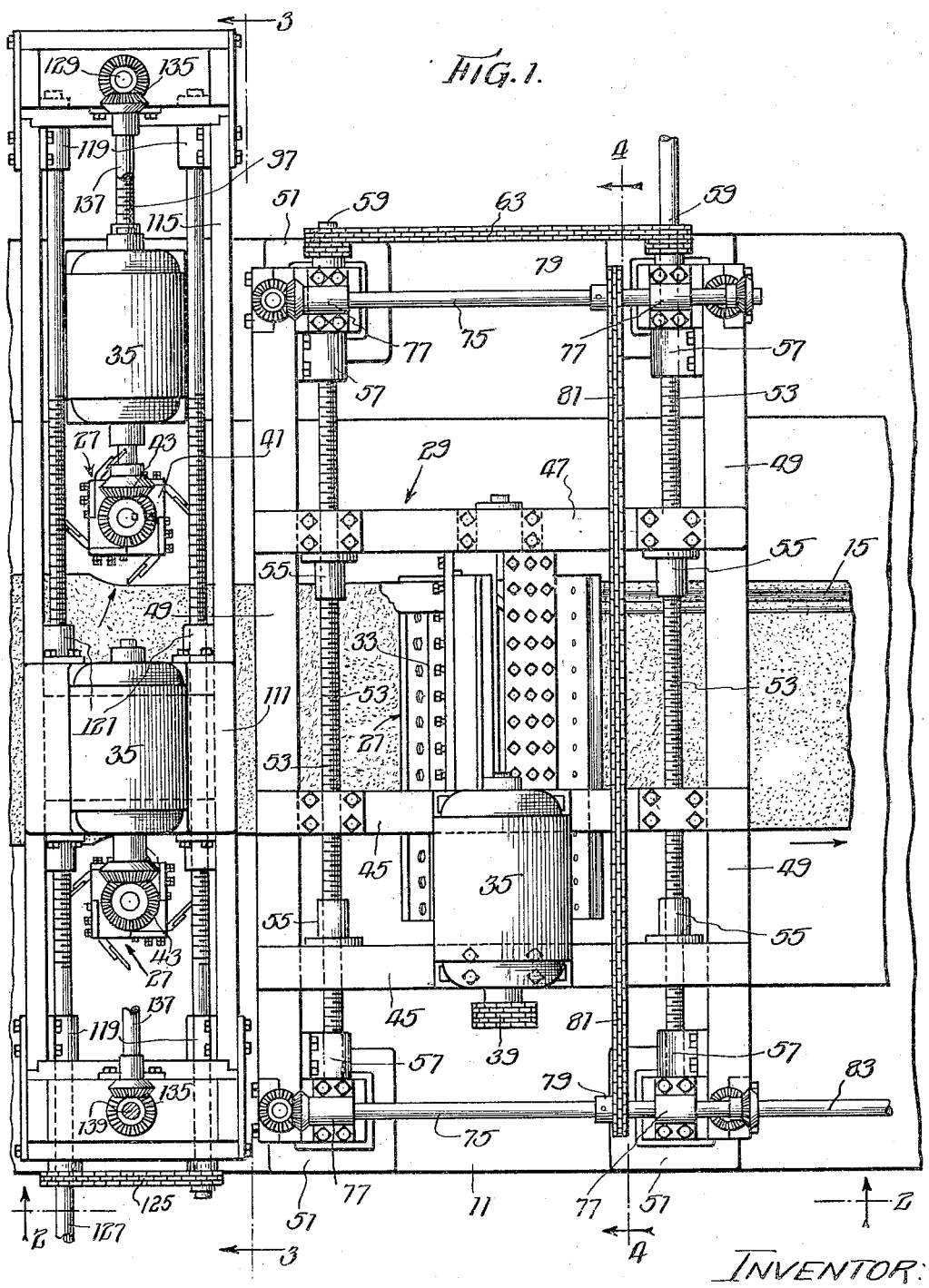
Figure 1 is a top plan view of a stone milling machine embodying my invention.

To illustrate my invention I have shown on the drawings a stone milling machine, the various elements of which are supported from a base or main frame 11. A work support 13, comprising a shiftable table upon which a work piece 15 may be firmly and securely mounted, is supported in the frame 11 by ways 17 in which the work support 13 may have reciprocal sliding movement, the ways being mounted in the frame and providing a grooved channel 19 adapted to receive an outwardly extending ribbed projection 21 formed to the work support 13. The work support may be reciprocated in the ways 17 by any suitable source of power such as a prime mover 35, which in the drawings is illustrated as an electric motor, mounted in the frame 11 and connected by a train of gears 25 to the work support. A plurality of rotary cutters 27 are supported in supplemental support frames 29, which in turn are movably mounted to the main frame or base 11 on support members 31.

In the illustrated embodiment I have shown three rotary cutters 27, one of which, 33, is arranged to rotate about a horizontal axis and to operate upon a horizontal surface of the work piece, while the remaining cutters, 41, are arranged to rotate about axes extending substantially in non-parallel relationship with respect to the axis of the cutter 33 whereby these cutters may operate upon remote surfaces bearing an angular relationship to the surface of the work piece upon which the cutter 33 operates, so that when the work piece 15 is advanced to the cutters, several remote and angularly disposed faces of the work piece may be operated upon simultaneously by the cutters. The cutters may be operated by any suitable sources of power, which in the illustrated embodiment comprise a plurality of prime movers, specifically electric motors, 35, which are mounted in the supplemental support frames 29 and connected to the cutters by suitable driving means which in the illustrated embodiment, in the case of the cutter 33, consists of sprockets 37 mounted respectively on the drive shaft of the cutter 33 and the shaft of its driving motor, and a chain 39 travelling around the sprockets to furnish driving connection therebetween. In the case of the lateral or angularly disposed cutters 41, the driving connection comprises a cooperating pair of beveled gears 43, one of which is mounted to a drive shaft of a prime mover 35 and the other of which is mounted to a driven shaft of a cutter.

The horizontal cutter 33 and its driving motor 35 are supported in a movable frame 29 which consists of an upper frame-work 45 in which the motor 35 is carried and a lower frame-work 47 carrying the cutter. These frames 45 and 47 are mounted for transverse or lateral movement with respect to the main frame or base 11 and the support table 13, being slidably mounted in upper and lower frames 49 extending between pairs of uprights 51 which are mounted to the base 11 and extend upwardly thereof on opposite sides of the work support 13. The frames 45 and 47 are slidably mounted to the members 49 and means is provided for shifting the frames 45 and 47 simultaneously and together with respect to the members 49. These means comprise threaded shafts 53 extending through and having engagement with internal threaded fittings 55 mounted to the frames. The threaded rods 53 are journaled at their extremities in bearings 57 which are mounted to the laterally extending members 49 and which have projecting ends 59 carrying sprockets 61. The sprockets 61 are interconnected by driving chains 63 whereby, upon rotation of one shaft 53, all the shafts may be synchronously rotated. One of the shafts 53 is extended as at 65 for connection with any suitable source of driving power (not shown) which may of course be a hand wheel, an electric motor, or any suitable controllable means for turning the shafts. It will be obvious that, by rotating the end 65 of a shaft 53, all of the shafts will be rotated in the fittings 55 and will cause the frames 47 and 45 to shift relatively and carry the cutter 33 to any desired relative position above the work piece 15. A similar arrangement may, of course, be provided for the lateral cutters 41.

Means is also provided for moving the cutter 33 toward and away from the work piece 15 whereby the depth of the cut taken in the work piece by the cutter may be adjusted. These means include vertically extending threaded rods 67 rotatably mounted to the vertical uprights 51, being journaled at their extremities in bearings 69, mounted to the uprights. The rods 67 extend upwardly of the upper bearings 69 and carry beveled drive gears 71. The rods also are threaded through internally threaded fittings 73 which are mounted to the members 49 whereby, upon rotation of the threaded rods 67, the members 49 may be raised or lowered relatively to the uprights 51. The rods 67 are rotated by means of counter shafts 75 provided with beveled gears having driving engagement with the gears 71 and which are journaled in bearings 77 mounted to the uprights 51. Each counter shaft carries a sprocket 79 and a chain drive 81 passes around these sprockets to provide a driving connection between the counter shafts. One of the counter shafts is extended as at 83 and connected to any suitable source of driving power (not shown) which of course may be a handle or an electric motor or any suitable controllable means for rotating the counter shaft.

The lateral cutters 41 may be supported in any convenient manner providing for their movement to and from the work piece, and I have shown one of the lateral cutters at 105 mounted for rotation in a shiftable carriage 85 which is slidably mounted in a way 87. The way 87 is carried in a support 89 extending upwardly of the base 11. The carriage 85 is provided with a vertical bearing 91 in which the upper end of the cutter shaft is journaled and has a bracket 93 extending therefrom and provided with a bearing 95 in which the lower end of the cutter shaft is journaled. The carriage 85 also provides means for supporting the prime mover 35 which may be arranged thereon in any suitable of convenient manner. The way 87 is arranged to guide the carriage to and from the work piece 15 and means is provided for so moving the carriage. The carriage moving means includes a threaded shaft 97 which is journaled at 99 in the pedestal 89 and which has a threaded end connecting with a threaded fitting 101 mounted to the carriage. The rod 97 is extended as at 103 beyond the bearing 99 to provide a connection for suitable means (not shown) for rotating the shaft. This prime mover, of course, may be of any convenient type such as an electric motor or any other suitable means for rotating the shaft. It will be apparent that by rotating the shaft in one direction, the carriage 85 will be projected toward the work piece 15 and the cutter may be arranged in position to operate upon the work piece and by rotating the shaft 97 in the reverse direction, the cutter may be withdrawn from the work piece. By regulating the rotation of the shaft 97, the cutter may be set to take a cut of desired thickness in the work piece.

The other lateral cutter I have shown at 107. This cutter is carried at the end of a shaft, the central portions of which are journaled in a bearing 109 formed in a frame 111.

The frame 111 is slidably mounted to a frame 115 extending between uprights 113, which in turn are mounted to and extend upwardly of the base 11, the frame 115 being also slidably mounted to the uprights 113. Means is provided for moving the frame 113 in the frame 115. This means comprises a pair of rods 117 journaled at its extremities in bearings 119 mounted to the frame 115. These rods are threaded through internally threaded fittings 121 mounted to the support frame 111 so that upon rotation of the rods 117, the frame 111 may be moved along the frame 115. The rods 117 are provided with sprockets 123 and a chain 125 provides driving engagement between these sprockets so that upon rotation of one rod 117, the other rod will rotate in synchronism. One of the rods is extended as at 127 for engagement with a suitable driving means (not shown), which of course may be an electric motor. Means is provided for raising and lowering the frame 115 in order to adjust the altitude of the cutter. This is accomplished by threaded rods 129 which are journaled at their extremities in bearings 131 mounted to the uprights 113. These rods make threaded engagement through a fitting 133 mounted to the frame 115 so that upon rotation of the rods 129, the frame will be raised and lowered with respect to the side supports 113. The upper ends of the rods 129 are extended upwardly of the upper bearings 131 and are provided with sprockets 135 which are interconnected by a drive chain 137 whereby the rods 129 rotate synchronously when one is driven. One of the rods 129 is extended as at 139 to connect with a suitable source of driving power (not shown) which of course may be an electric motor.

Figure 2:
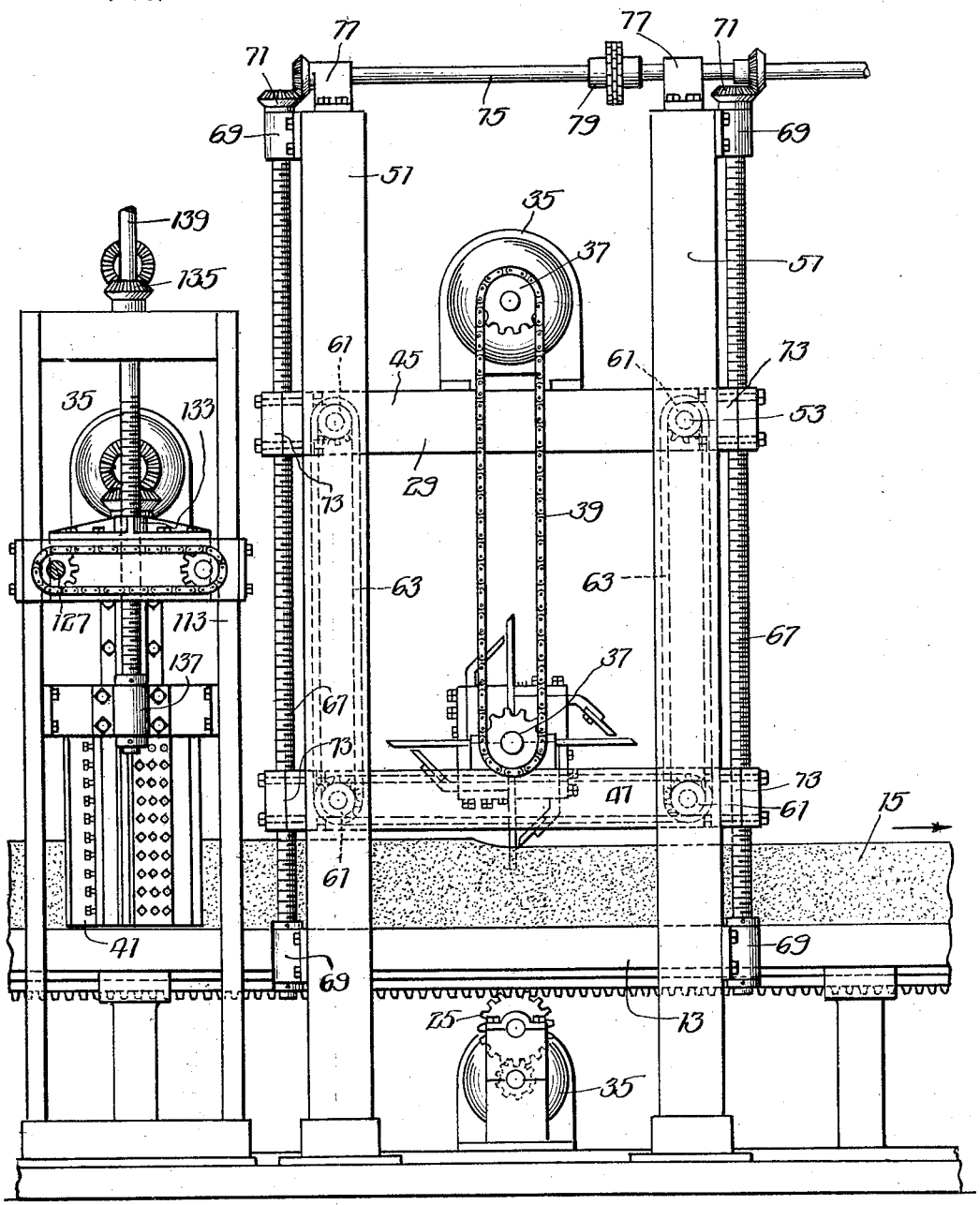
Figure 2 is a vertical cross section taken substantially along the line 2—2 in Figure 1.
Figure 3:
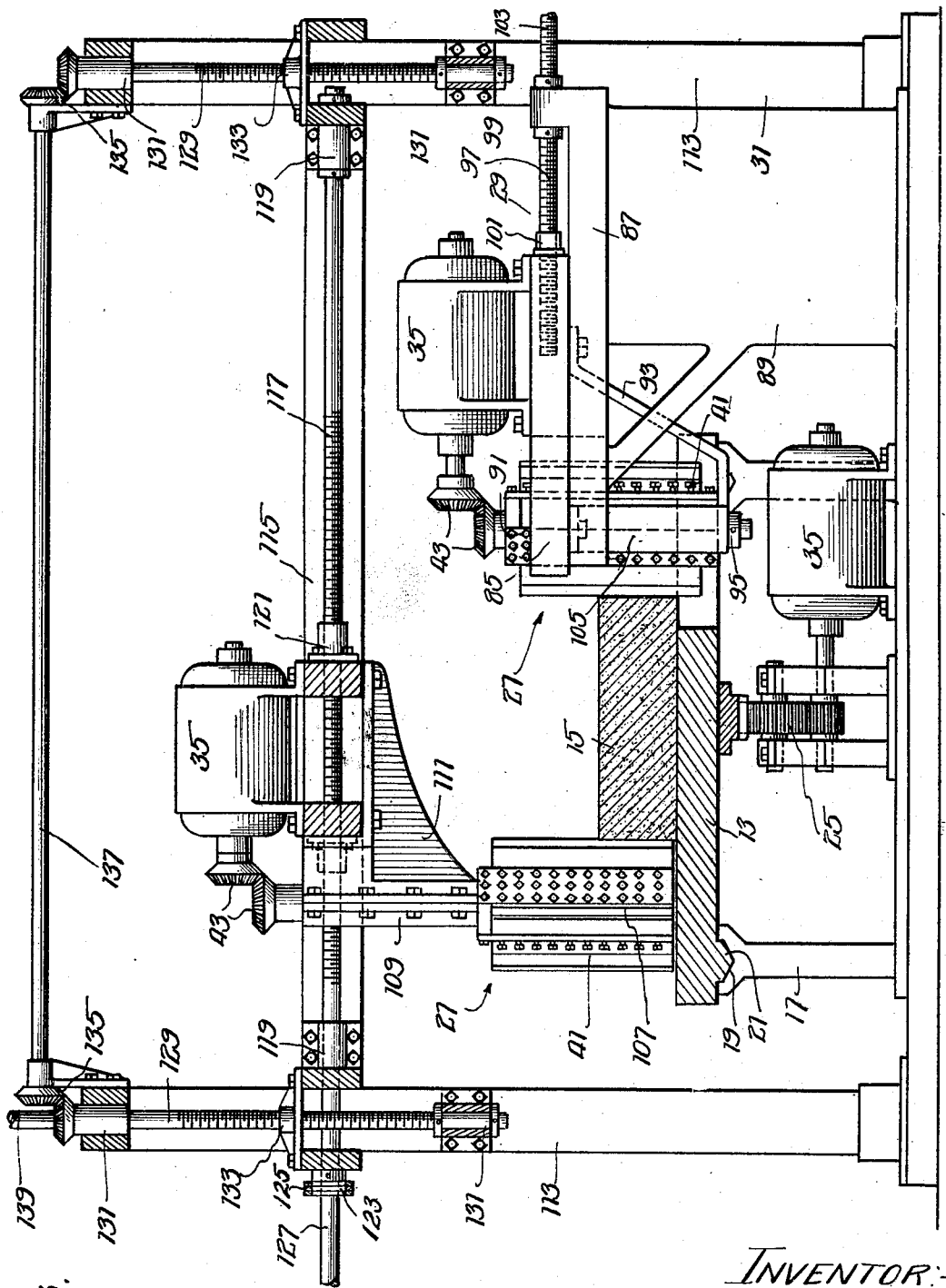
Figure 3 is a vertical cross section taken substantially along the line 3—3 in Figure 1.
Figure 4:
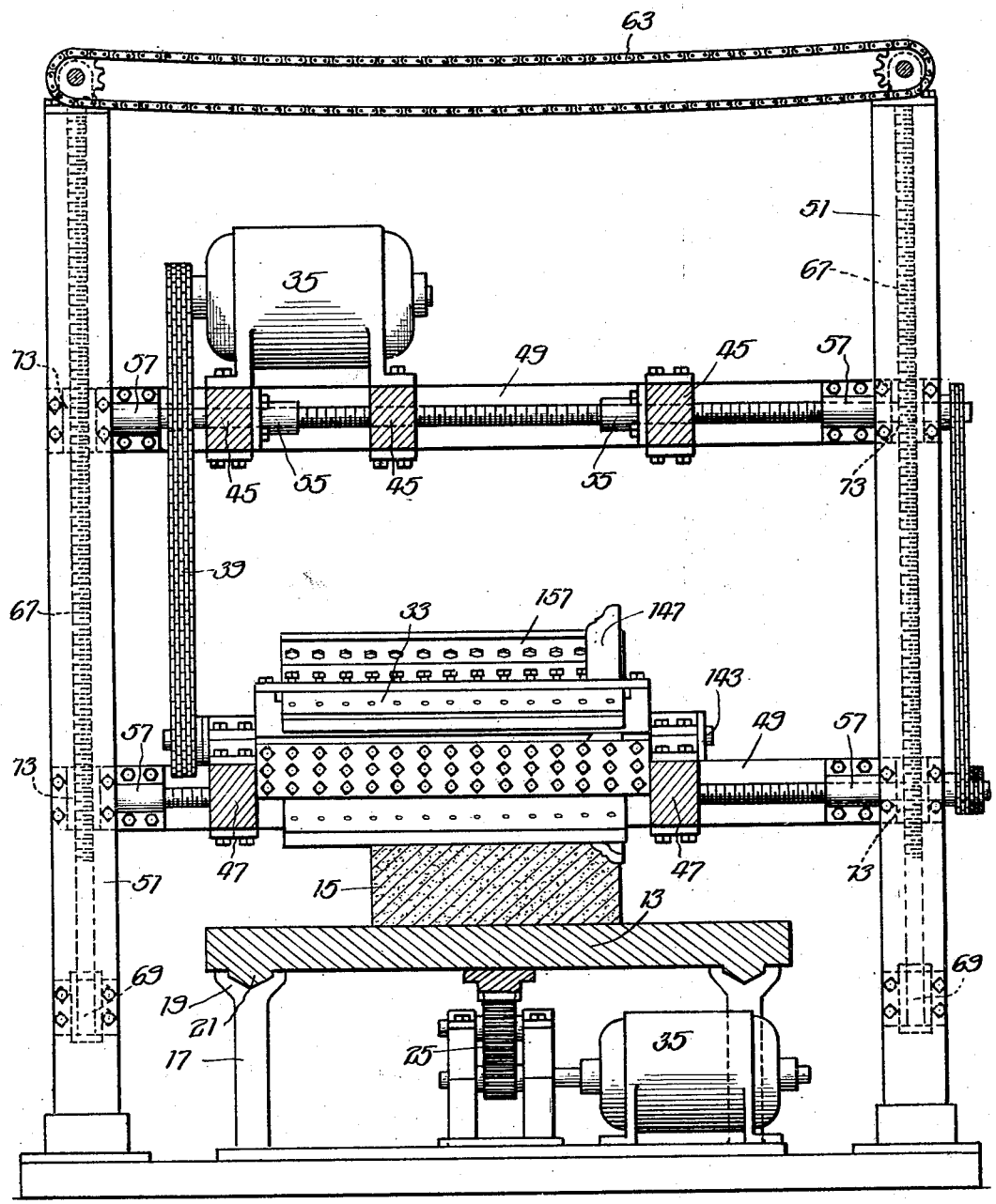
Figure 4 is a vertical cross section taken substantially along the line 4—4 in Figure 1.

It will be apparent that by means of the apparatus hereinbefore described that the cutters may be moved toward the work piece 15 in order to take a cut of any desired depth therein. In operation, the motor 23 is driven to move the work support 13 and the work piece 15 past the cutters in a direction illustrated by the arrows in Figures 1 and 2. It will be apparent that the speed at which the work piece 15 is fed past the cutters may be determined by suitably regulating the speed of rotation of the motor 23 which may be accomplished by suitable well known control means. It will also be apparent that the speed of rotation of the motors 35 may be controlled by similar control means, and that the positions of the several cutters relative to the work piece may be adjusted automatically by suitably controlling the means for rotating the threaded rods 53, 67, 97, 117 and 129, all of which may be accomplished by providing suitable interlocked electrical remote control apparatus for the several driving means attached to the threaded shafts. In this way the operation of the various parts of the device may be synchronized and the apparatus made relatively automatic and controllable from a single station, to the end that a work piece may be completely finished in one operation, the work piece remaining in the work support throughout the milling. This is possible for the reason that the cutters may be quickly and easily adjusted to take a thin cut in the work piece after the preliminary roughing cut has been taken. By means of my apparatus, the resetting of the cutters for the finishing cut may be accomplished in a minimum time.

The cutters 27 may of course be of any desired type, but I prefer to use cutters substantially as shown in Figures 5 and 6 of the drawings. These cutters comprise a holder 141 mounted to a cutter shaft 143. In the illustrated embodiment, the holder 141 comprises a rectangular block and is provided with a plurality of radially extending slots 145 in which knives 147 are adapted to seat. These knives are retained in position in the slots 145 by means of set screws 149 extending from a remote face of the holder and entering the slots at points in the sides thereof whereby the tips of the set screws 149 may grip the cutter blades 147 and clamp the same against the opposite face of the slots. The cutter blades 147, mounted in the radially extending slots 145, have cutting edges 151 of a formation adapted to cut stone moulding, as shown clearly in Figure 5 of the drawings.

The holder 141 is arranged to carry straight edged milling cutters. I find it is advantageous to present the straight edged milling cutters to the work piece at an angle. For this purpose I form in the holder 141 tangentially extending slots 153 adapted to receive a holder 155 for a straight edged milling cutter blade 157. Each holder 155 has a butt 159 adapted to seat in a tangentially extending groove and an outer portion 161, having means 163 for securing a cutter blade 157 thereto and offset as at 165 toward the radially extending moulding cutter blade so as to present the straight edged cutter blades to the work piece at an angle which in the illustrated embodiment is substantially 45 degrees, as clearly shown in Figure 6. It will be noted that with this construction the cutting edge of the straight edged milling blade is arranged slightly behind the moulding cutter blade. Set screws 167 are arranged to secure the holders 155 in the tangentially extending slots 153.

Among the advantages provided by the rotary cutter of my invention, is the fact that the moulding cutter blades may be quickly and easily removed so that the straight edged cutter blades may operate alone upon the work piece. Another advantage is that the moulding cutter blades and straight edged cutter blades may be used simultaneously, the cutting edges of both blades lying in substantially the same radial plane. A still further advantage resides in the ease with which the various blades may be removed or adjusted in order to compensate for wear.

It is thought that the invention and numerous of its attendant advantages will be understood from the foregoing description and it is obvious that numerous changes may be made in the form, construction and arrangement of the various parts without departing from the spirit and scope of the invention or sacrificing any of its attendant advantages, the form hereinbefore described being of a preferred embodiment only.

Having thus described by invention, what I claim as new and desire to secure by Letters Patent is:

1. A stone milling machine comprising a rotatable holder, blades extending from the holder in sets, each set comprising an elongated straight edged blade extending substantially tangentially of the holder with its cutting edge pointing in the direction of rotation of the holder and a blade of substantially lesser width and having a configurated cutting edge extending radially of the holder in front of the cutting edge of the elongated blade and projecting outwardly beyond said edge whereby the elongated blade will cut a flat surface and the configurated blade will undercut the flat surface.

2. A stone milling machine comprising a rotatable holder, blades extending from the holder in sets, each set comprising an elongated straight edge blade extending substantially tangentially of the holder with its cutting edge pointing in the direction of rotation of the holder and a blade of substantially lesser width and having a configurated cutting edge extending radially of the holder in front and closely adjacent said edge and projecting outwardly beyond said edge whereby the elongated blade will cut a flat surface and the configurated blade will undercut the flat surface.

In witness whereof, I have hereunto subscribed my name.

CHARLES A. COLGREN.